United States Patent [19]

Van Eenam

[11] Patent Number: 4,520,184

[45] Date of Patent: * May 28, 1985

[54] POLYETHERENE-POLYACRYLIC POLYMERIZABLE COMPOSITIONS

[75] Inventor: Donald N. Van Eenam, Des Peres, Mo.

[73] Assignee: Monsanto Company, St. Louis, Mo.

[ * ] Notice: The portion of the term of this patent subsequent to Jun. 8, 1999 has been disclaimed.

[21] Appl. No.: 500,700

[22] Filed: Jun. 3, 1983

[51] Int. Cl.³ ............................................ C08F 220/32
[52] U.S. Cl. .................................... 526/320; 525/370
[58] Field of Search ................ 526/320; 525/404, 345, 525/370

[56] References Cited

U.S. PATENT DOCUMENTS

| | | | |
|---|---|---|---|
| 2,928,804 | 3/1960 | Foster | 260/45.4 |
| 3,734,876 | 5/1973 | Chu | 525/404 |
| 3,770,702 | 11/1973 | Roper | 260/73 |
| 4,049,634 | 9/1977 | Ko et al. | 260/75 |
| 4,199,492 | 4/1980 | Roth | 260/42.43 |
| 4,296,227 | 10/1981 | Seeburger et al. | 525/404 |
| 4,333,971 | 6/1982 | Van Eenam | 427/389.9 |

*Primary Examiner*—Joseph L. Schofer
*Assistant Examiner*—Peter F. Kulkosky
*Attorney, Agent, or Firm*—R. Bruce Blance; William J. Farrington; Paul D. Matukaitis

[57] ABSTRACT

Compositions comprising a non-air-drying polyacrylyl monomer and a polyetherene selected from the group consisting of oligomers of allyl glycidyl ether. The compositions provide hard, clear, glossy, abrasion resistant polymers.

31 Claims, No Drawings

POLYETHERENE-POLYACRYLIC POLYMERIZABLE COMPOSITIONS

BACKGROUND OF THE INVENTION

This invention relates to ethylenically unsaturated polymerizable compositions, to a process of polymerizing such compositions and to the polymerized products thereof. More specifically the invention is directed to compositions polymerizable in the presence of air comprising a non-air-curing polyacrylyl monomer and an oligomeric polyallyl ether, to a process of polymerizing such compositions and to the polymers obtained from such compositions.

The polymerization of non-air-curing polyacrylyl monomers in the presence of normally inhibiting quantities of oxygen or air has been achieved in the past by addition of high molecular weight polyesters containing a plurality of allyloxymethyl groups. Lower molecular weight allyloxy compounds have been found to be ineffective unless they were incorporated into polyfunctional aldehydes. Such systems give polymers which tend to be readily oxidized and discolored and to be unstable when exposed to acid hydrolysis environment. Complex mixtures of polyacrylyl oligomers containing internal double bonds and polyacrylyl oligomers containing pendant allyloxy groups have been developed as air curing systems. However such systems require several synthesis steps and yield products unsatisfactory in hydrolysis resistance containing residual internal unsaturation subject to post cure oxidative degradation.

The present invention provides compositions which overcome these deficiencies. The compositions are solventless or high solids compositions comprising:

A. a polyetherene represented by the structure:

$$R_1 + (E)_m - R_2]_n$$

where $R_1$ is a radical of molecular weight less than about 2000 obtained by removal of active hydrogen from an active hydrogen compound selected from the group consisting of water, alcohols, thiols, carboxylic acids, carboxylic amides and amines, where the functionality of $R_1$ is n and is in the range of 1 to 10, where E is represented by the structure $$\begin{array}{c} CH_2-CH-O \\ | \\ CH_2-O-CH_2-CH=CH_2, \end{array}$$

where $R_2$ is selected from the group consisting of hydrogen and $C_1$ to $C_{10}$ organic radicals, where the product of m and n is at least 4 and not more than about 60 and where the allyloxy equivalent of the polyetherene is less than about 300; and B. a non-air-curing polyacrylyl monomer represented by the structure:

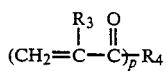

$$(CH_2=C-C)_p R_4$$
with $R_3$ and $O$ above where $R_3$ is selected from the group consisting of H, methyl or ethyl, p is an integer in the range of 2 to 10, and $R_4$ is the residue of a polyol, a polycarboxylic acid, a polyamide, a polyepoxide or a polyisocyanate of molecular weight less than about 2000, containing a hydrocarbon, polyester, polyamide, polyether or polyurethane backbone;

wherein the weight ratio of polyetherrene to non-air-curing ethylenically unsaturated monomer is in the range of from 1:19 to 1:1.

Another aspect of the invention is directed to a process for polymerizing these compositions in an oxygen containing atmosphere at temperatures up to about 120° C., and yet another aspect of the invention is directed to the polymeric products obtained from the compositions of the invention.

The polyetherenes of the present invention can be prepared by adding allyl glycidyl ether to an active hydrogen compound, the addition being catalyzed by Lewis acid or by base catalysis. The active hydrogen compound is selected from the group consisting of water, alcohols, thiols, carboxylic acids, primary and secondary carboxylic amides and primary and secondary amines of molecular weight up to about 2000 and provides the nucleus radical $R_1$ of the polyetherene. The backbone of the radical $R_1$ derived from the active hydrogen compound may be a hydrocarbon moiety, a polyether moiety, a polyester moiety, a polyamide moiety or a polyurethane moiety and can be selected to enhance the compatibility of the polyetherene with the non-air-curing polyacrylyl monomer. Preferably the active hydrogen compound is selected from the group consisting of water, an alcohol or a polyol. Advantageously the functionality of the active hydrogen compound is in the range of 1 to 10, and sufficient allyl glycidyl ether is added thereto to give a polyetherene with values of m and n such that their product is at least about 6 and not more than about 60 and with an allyloxy equivalent of less than about 250. Preferably, the product of m and n is not more than about 40 and the allyloxy equivalent is less than about 150 and even more preferably the allyloxy equivalent is less than about 120. Advantageously the value of m is at least 3 so that the allyloxy groups are present in the molecule in groups of three or more to provide a close spatial relationship between them.

The $R_2$ group is selected from the group consisting of hydrogen and $C_1$ to $C_{10}$ saturated or unsaturated organic radicals. The $R_2$ group may for example be a hydrocarbon radical, an acyl group such as acetyl or acrylyl, or a 1,2-epoxy group such as glycidyl. Preferably $R_2$ is a hydrogen atom.

The non-air-curing polyacrylyl monomer is represented by the structure:

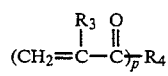

$$(CH_2=C-C)_p R_4$$
with $R_3$ and $O$ above where $R_3$ is selected from the group consisting of hydrogen, methyl and ethyl, p is an integer in the range of 2 to 10, and $R_4$ is the residue of a polyol, a polycarboxylic acid, a polyamine, a polyepoxide or a polyisocyanate of molecular weight less than about 2000 and equivalent weight less than 500, containing a hydrocarbon, polyester, polyamide, polyether or polyurethane backbone. The non-air-curing polyacrylyl monomer can be prepared by esterification of a polyol or the amidation of a polyamine with acrylic acid, methacrylic acid or ethacrylic acid or with acryloyl chloride, methacryloyl chloride or ethacryloyl chloride or it can be prepared by the esterification of a polycarboxylic acid with a $C_5$ to $C_9$ unsaturated alcohol such as a hydroxyalkyl acrylate, a hydroxyalkyl methacrylate or a hydroxyalkyl ethacrylate. Exemplary of such unsaturated alcohols are 2-hydroxyethyl acrylate, 2-hydroxyethyl methacrylate, 2-hydroxyethyl ethacrylate, 2-hydroxypropyl acrylate and 3-hydroxypropyl methacrylate. The non-air-curing polyacrylyl monomer can be prepared by reaction of the unsaturated acids and alcohols discussed hereinabove, with polyepoxides and polyisocyanates. Preferably the polyacrylyl monomer is prepared from a polyfunctional compound which provides an $R_4$ moiety to enhance the compatibility of the polyacrylyl monomer with the polyetherene. Generally such compatibility can be enhanced when $R_1$ and $R_4$ are of the same chemical constitution i.e. they both contain hydrocarbon or polyester, or polyether, or polyamide or polyurethane backbones. The non-air-curing behavior of these monmers upon exposure to an oxygen atmosphere is caused by the inhibition of polmerization by oxygen. The addition of polyetherene enables the polyacrylyl monomer to overcome the inhibition.

The weight ratio of polyetherene to non-air-curing polyacrylyl monomer is advantageously in the range of about 1:19 to about 1:1 and is preferably in the range of about 1:9 to about 1:2 to provide a rapid rate of cure of the composition in the presence of oxygen and to yield a cured composition with good clarity and surface gloss. Advantageously the composition contains a ratio of allyloxy groups to acrylyl groups in the range of about 1 to 20 to about 1 to 1, and for rapid cure of the composition, the ratio is preferably in the range of about 1 to 10 to about 1 to 3.

The compositions of the invention can be cured readily in the presence of air. Indeed the rapid rate of cure of the compositions provides a significant advantage. Such cure can be effected at room temperature especially when the compositions have been exposed to air for a sufficient time to allow the absorption of oxygen into the composition and can be accelerated by subjecting the compositions to a temperature up to about 120° C. Preferably a temperature in the range of about 50° to about 90° C. is selected to enhance the cure rate and to minimize degradation of the polyetherene.

The rate of cure of the compositions of the invention can be accelerated by the presence of a heavy metal salt such as cobaltous acetate, cobaltous octoate, cobaltous ethylhexanoate, manganous acetate and other organic salts of transition metals known to be capable of functioning as "metallic driers" in the paint field. Advantageously the concentration is in the range of about 0.01 to about 1 weight percent. Organic peroxides and hydroperoxides such as benzoyl peroxide, lauroyl peroxide, cumene hydroperoxide, t-butyl hydroperoxide and similar peroxy initiators and azo compounds such as azo-bis-(isobutyronitrile) in concentrations in the range of about 0.01 to about 5 weight percent of the composition are also found to be effective either alone, with tertiary amine or in conjunction with known promoters and/or the metallic driers described above. Indeed when the compositions are cured in the absence of air, a significantly enhanced cure rate is obtained with an accelerator combination comprising metallic drier and organic hydroperoxide.

In addition to the polyacrylyl monomer containing two or more non-air-curing free radical polymerizable unsaturations, it is possible to use varying amounts of non-air-curing monomers containing a single unsaturation. As will be appreciated such monomers are not considered to be efficient in generating cross-links but act as "extenders" in the compositions of the invention. Generally the amount of such an extender will be determined by the degree of reduction in the overall cross-link density that can be tolerated. In practice a monounsaturated compound can replace up to 50% of the weight of the polyacrylyl monomer. Suitable monounsaturated free-radical polymerizable monomers include acrylic monomers such as methyl methacrylate, ethyl acrylate and 2-ethylhexyl acrylate, acrylic acid and methacrylic acid, styrene and vinyl acetate.

Advantageously for enhanced pigment wetting and improved substrate adhesion, from about 0.5 to about 10 weight percent of the polyacrylyl monomer can be replaced with acrylic acid or methacrylic acid.

The compositions of the invention find utility as coating compositions, adhesives, impregnants for fibrous compositions, and as casting and potting compositions. Other conventional additives such as pigments, fillers, reinforcing agents, stabilizers, flow control additives and wetting agents can be added to the compositions if desired.

The cured compositions of the invention are characterized by their hardness, abrasion resistance, toughness, gloss, clarity and weather resistance. Films of the cured compositions possess excellent hydrolysis resistance and resistance to weathering.

The invention is more particularly described by the following examples which are presented for illustration and are not intended to limit the scope. In the examples, units are by weight unless designated otherwise.

EXAMPLE 1

This example illustrates the preparation of an allyl glycidyl ether adduct of ethylene glycol.

A reaction kettle equipped with a stirrer, condenser and adapted to prevent air-flow into the vessel is charged with 416 parts by weight of ethylene glycol and 50 parts by weight of a boron trifluoride etherate catalyst. The kettle is heated to about 77°-78° C. and 8560 parts by weight of allyl glycidyl ether is added at a uniform rate over 2 hours. The reaction mixture is cooled to 20° C. and a further 30 parts of the catalyst is added. The temperature is raised to 77°-78° C. again and addition of another 8560 parts by weight of allyl glycidyl ether is made in a further 2 hours and the mixture is maintained at from 78° to 80° C. for an extra half-hour thereafter before being allowed to cool to room temperature.

Ether is added to the cooled solution along with about 100 parts of a 10% aqueous solution of sodium hydroxide to destroy the catalyst. Dry ice is then added to convert any residual sodium hydroxide to the bicarbonate. The ether extract is dried over sodium sulfate for two days.

After filtration and distillation to remove the solvent and residual volatiles 17360 parts by weight of a pale yellow oily product are obtained representing a yield of 98.7% of the theoretical. The allyloxy equivalent is about 120.

EXAMPLE 2

This example illustrates the preparation of an allyl glycidyl ether adduct of sorbitol.

The apparatus used in Example 1 is charged with 911 parts by weight of powdered anhydrous sorbitol followed by 30 parts by weight of boron trifluoride etherate as catalyst. The temperature of the flask is slowly raised to 95° C. at which temperature the sorbitol is a liquid. The slow dropwise addition of 17180 parts by weight of allyl glycidyl ether is begun and after about 1000 parts has been added the reaction mixtured clears. The reaction temperature is then gradually reduced to about 80° C.

After about one third of the allyl glycidyl ether has been added, the addition is stopped, the reacted mixture cooled to room temperature and a further 20 parts by weight of the catalyst is added. The temperature is then raised to about 80° C. and addition of the allyl glycidyl ether is recommenced. This procedure is repeated after about two-thirds of the ether has been added.

Addition of the allyl glycidyl ether is complete in about 5 hours after which the reaction is continued for a further half-hour at the reaction temperature before being allowed to cool. The reaction mixture is moderately viscous and is worked up and purified in the manner described in Example 1.

The product obtained in 18200 parts by weight of a very pale, straw colored, slightly opalescent oil which is rather viscous at room temperature. This yield is practically quantitative. The allyloxy equivalent is about 118.

EXAMPLE 3

This example illustrates the preparation of a polyetherene-urethane from the polyetherene of Example 1.

The polyetherene of Example 1 is reacted with hexamethylene diisocyanate in the mole ratio of 2:1 to provide a polyetherene-urethane, with an allyloxy equivalent of about 126.

EXAMPLE 4

This example illustrates the preparation of a polyetherene containing a polyalkyleneoxy backbone.

The process of Example 1 is repeated with 50 parts by weight of a polyethylene glycol of molecular weight 1000 and 114 parts by weight of allyl glycidyl ether. The reaction temperature is 77° to 78° C.

Upon completion of the reaction, the product is separated and purified in the manner described in Example 1. 147 parts of a yellow, fairly fluid oil are obtained. The allyloxy equivalent is about 170.

EXAMPLE 5

This example illustrates the preparation of a polyetherene-ester containing a polyester backbone.

The process of Example 1 is repeated with 50 parts by weight of a polyester diol of molecular weight about 1000 prepared from neopentyl glycol and succinic acid in the mole ratio of 6 to 5, and 114 parts by weight of allyl glycidyl ether. The reaction temperature is 77° to 78° C.

Upon completion of the reaction, the product is separated and purified in the manner described in Example 1. A pale yellow, fairly fluid oil is obtained of allyloxy equivalent about 165.

EXAMPLE 6

A blend of 20 parts by weight of trimethylolpropane trimethacrylate, 10 parts by weight of the polyetherene of Example 1, 1 part by weight of acrylic acid and 0.1 part by weight of a 12 weight percent solution of cobalt 2-ethylhexanoate in cyclohexane is prepared and coated on glass and stainless steel plates to provide films of 5 micron thickness. The coatings are cured at 90° C. for 30 minutes in a circulating air oven. After cure, the coatings are tough, highly adherent, clear and glossy. Their hardness rating is 5H. They are resistant to methyl ethyl ketone, toluene and methanol solvents.

EXAMPLE 7

A blend of 15 parts by weight of dipentaerythritol pentaacrylate, 15 parts by weight of the polyetherene of Example 3, 1 part by weight of acrylic acid, 0.1 part by weight of a 12 weight percent solution of cobalt 2-ethylhexanoate in cyclohexane and 15 parts by weight of toluene are blended. The blend is coated on a stainless steel to provide a film of 5 micron thickness. The film is allowed to dry in air for 30 minutes at room temperature and is then cured at 90° C. for 30 minutes in a circulating air oven. The coating is clear, glossy, very tough, highly adherent and has high impact resistance. Its hardness rating is 6H. It is resistant to methyl ethyl ketone, toluene and methanol solvents.

EXAMPLE 8

A blend of 20 parts by weight od dipentaerythritol pentaacrylate, 10 parts by weight of the polyetherene of Example 2, and 1 part by weight of a 12 weight percent solution of cobalt 2-ethylhexanonate in cyclohexane is prepared. The blend is applied with a brush to one side of each of two white pine blocks (25.4×76.2×76.2 mm) to provide a uniform film. The films are allowed to dry at room temperature for several minutes and the treated sides of the blocks are pressed together, clamped and placed in an oven at 90° C. for 30 minutes. The two blocks are strongly bonded and the bond survives hammer blows.

EXAMPLE 9

A blend of 15 parts by weight of a difunctional acrylated epoxy oligomer of molecular weight 524 sold by Celanese Corporation under the tradename Celrad 3700, 5 parts by weight of the polyetherene of Example 1, 1 part by weight of acrylic acid, 20 parts by weight of toluene and 0.1 part by weight of 12% cobalt 2-ethylhexanoate in cyclohexane is prepared. Air is bubbled through the blend for 15 minutes at room temperature, at which time the solution has changed from a slight purple to a greenish-grey purple color. The blend is applied to a glass plate to provide a wet film of 5 micron in thickness. Solvent is allowed to evaporate at room temperature for 10 minutes. The film is cured in a circulating air oven for 30 minutes at 90° C. A tough, clear, tightly adhering coating is obtained, possessing high gloss, a pencil hardness rating of 4H and solvent resistance to methyl ethyl ketone, toluene and methanol.

EXAMPLE 10

A blend of 20 parts by weight of trimethylolpropane triacrylate, 5 parts by weight of the polyetherene of Example 1, 0.04 part by weight of t-butyl hydroperoxide and 0.1 part by weight of cobalt 2-ethylhexanoate in cyclohexane is filled with fine sand and cured at 90° C. for 30 minutes. An extremely hard, strong, tough, shatter resistant casting is obtained.

EXAMPLE 11

A blend of 20 parts by weight of the diacrylate of poly(neopentyl glycol succinate) diol of molecular weight about 640, 10 parts by weight of the polyetherene of Example 5, 20 parts by weight of toluene, and 0.1 part of a 12 weight percent solution of cobalt 2-ethyl-hexanoate in cyclohexane is prepared. The blend is coated on a stainless steel panel to provide a wet film of 5 micron thickness. The film is dried at room temperature and cured at 90° C. The cured film is hard, glossy and solvent resistant.

EXAMPLE 12

A blend of 20 parts by weight of the diacrylate of a polyethylene glycol of molecular weight about 500, 10 parts by weight of the polyetherene of Example 4, 20 parts by weight of methyl ethyl ketone, and 0.1 part by weight of a 12 weight percent solution of cobalt 2-ethylhexanoate in cyclohexane is prepared. The blend is coated on a stainless steel panel to provide a wet film of 5 micron thickness. The film is dried at room temperature and cured at 90° C. The cured film is hard, glossy and solvent resistant.

I claim:

1. A composition of matter comprising:
   A. a polyetherene represented by the structure:

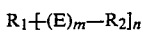

where $R_1$ is a radical of molecular weight less than about 2000 obtained by removal of active hydrogen from an active hydrogen compound selected from the group consisting of water, alcohols, thiols, carboxylic acids, carboxylic amides and amines, where the functionality of $R_1$ is n and is in the range of 1 to 10, where the E units are represented by the structure

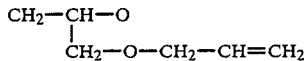

and are derived from allyl glycidyl ether, where $R_2$ is selected from the group consisting of hydrogen and $C_2$ to $C_{10}$ organic radicals, where the product of m and n is at least 4 and not more than about 60 and where the allyloxy equivalent of the polyetherene is less than about 250;
   B. a non-air-curing polyacrylyl monomer represented by the structure:

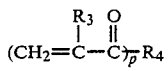

where $R_3$ is selected from the group consisting of H, methyl or ethyl, p is an integer in the range of 2 to 10, and $R_4$ is the residue of a polyol, a polycarboxylic acid, a polyamine, a polyepoxide or a polyisocyanate of molecular weight less than about 2000, containing a hydrocarbon, polyester, polyamide, polyether or polyurethane backbone; and
   C. a metallic drier: wherein the weight ratio of polyetherene to non-air-curing polyacrylyl monomer is in the range of from 1:19 to 1:1.

2. The composition of claim 1 wherein the allyloxy equivalent is less than about 150.

3. The composition of claim 1 wherein the weight ratio of polyetherene to non-air-curing ethylenically unsaturated monomer is in the range of 1:9 to 1:2.

4. The composition of claim 1 wherein $R_1$ is hydroxyl, or the radical obtained from a monohydric or polyhydric alcohol, $R_2$ is hydrogen, the product of m and n is less than about 40 and the allyloxy equivalent is less than about 120.

5. The composition of claim 1 wherein the radicals $R_1$ and $R_4$ are both hydrocarbon or polyester or polyamide or polyether or polyurethane.

6. The composition of claim 1 wherein the radicals $R_1$ and $R_4$ are both neopentyl glycol polyester.

7. The composition of claim 1 wherein the non-air-curing polyacrylyl monomer contains up to 50 weight percent of a mono-ethylenically unsaturated monomer.

8. The composition of claim 1 wherein the non-air-curing polyacrylyl monomer contains from about 0.5 to about 10 weight percent of acrylic acid or methacrylic acid.

9. The composition of claim 1 containing from 0.1 to 1% by weight of the metallic drier.

10. The composition of claim 1 containing up to 5% by weight of a free radical initiator.

11. The composition of claim 4 containing from 0.1 to 1% by weight of the metallic drier.

12. The composition of claim 4 containing up to 5% by weight of a free radical initiator.

13. A process of polymerizing a composition comprising a polyetherene and a non-air-curing polyacrylyl monomer which comprises adding up to 1% of a metal drier and exposing the composition to an oxygen containing atmosphere at a temperature in the range of about 25° to about 120° C.; wherein the polyetherene is represented by the structure:

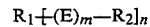

wherein $R_1$ is a radical of molecular weight less than about 2000 obtained by removal of active hydrogen from an active hydrogen compound selected from the group consisting of water, alcohols, thiols, carboxylic acids, carboxylic amides and amines, where the functionality of $R_1$ is n and is in the range of 1 to 10, where the E units are represented by the structure

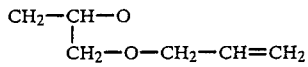

and are derived from allyl glycidyl ether, where $R_2$ is selected from the group consisting of hydrogen and $C_1$ to $C_{10}$ organic radicals, where the product of m and n is at least 4 and not more than about 60 and where the allyloxy equivalent of the polyetherene is less than about 250; wherein the non-air-curing ethylenically unsaturated monomer is represented by the structure:

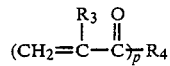

where $R_3$ is selected from the group consisting of H, methyl or ethyl, p is an integer in the range of 2 to 10, and $R_4$ is the residue of a polyol, a polycarboxylic acid, a polyamine, a polyepoxide or a polyisocyanate of molecular weight less than about 2000, containing a hydrocarbon, polyester, polyamide, polyether or polyurethane backbone; and wherein the weight ratio of polyetherene to non-air-curing ethylenically unsaturated monomer is in the range of from 1:19 to 1:1.

14. The process of claim 13 wherein the allyloxy equivalent is less than about 150.

15. The process of claim 13 wherein the weight ratio of polyetherene to non-air-curing ethylenically unsaturated monomer is in the range of 1:9 to 1:2.

16. The process of claim 13 wherein $R_1$ is hydroxyl, or the radical obtained from a monohydric or polyhydric alcohol, $R_2$ is hydrogen, the product of m and n is less than about 40, and the allyloxy equivalent is less than about 120.

17. The process of claim 13 wherein the radicals $R_1$ and $R_4$ are both hydrocarbon or polyester or polyamide or polyether or polyurethane.

18. The process of claim 13 wherein the radicals $R_1$ and $R_4$ are both neopentyl glycol polyester.

19. The process of claim 13 wherein the non-air-curing polyacrylyl monomer contains up to 50 weight percent of a mono-ethylenically unsaturated monomer.

20. The process of claim 13 wherein the non-air-curing polyacrylyl monomer contains from about 0.5 to about 10 weight percent of acrylic or methacrylic acid.

21. The process of claim 13 wherein up to 5% by weight of a free radical initiator is added to the polymerizable composition.

22. The process of claim 16 wherein up to 5% by weight of a free radical initiator is added to the polymerizable composition.

23. The polymerized product of claim 1.
24. The polymerized product of claim 4.
25. The polymerized product of claim 5.
26. The polymerized product of claim 6.
27. The polymerized product of claim 7.
28. The polymerized product of claim 8.
29. The composition of claim 1 containing from 0.01 to 5% by weight of an organic hydroperoxide.
30. The process of claim 13 wherein from 0.01 to 5% by weight of an organic hydroperoxide is added to the polymerizable composition.
31. The polymerized product of claim 29.

* * * * *

UNITED STATES PATENT AND TRADEMARK OFFICE
CERTIFICATE OF CORRECTION

PATENT NO. : 4,520,184
DATED : May 28, 1985
INVENTOR(S) : D.N. VAN EENAM

It is certified that error appears in the above-identified patent and that said Letters Patent are hereby corrected as shown below:

Column 1, line 25, delete "environment" and insert - - - environments - - -.

Column 2, line 3, delete "polyetherrene" and insert - - - polyetherene - - -.

Column 3, line 17, delete "monmers" and insert - - - monomers - - -.

Column 3, line 18, delete "polmerization" and insert - - - polymerization - - -.

Column 3, line 38, delete "composition" and insert - - - compositions - - -.

Column 4, line 50, delete "100 parts" and insert - - - 1000 parts - - -.

UNITED STATES PATENT AND TRADEMARK OFFICE
CERTIFICATE OF CORRECTION

PATENT NO. : 4,520,184

DATED : May 28, 1985

INVENTOR(S) : D. N. Van Eenam

It is certified that error appears in the above-identified patent and that said Letters Patent is hereby corrected as shown below:

Column 5, line 19, delete "in" and insert -- is --.

Column 6, line 20, delete "od" and insert -- of --.

Column 6, line 23, delete "2-ethylhexanonate" and insert -- 2-ethyhexanoate --.

Signed and Sealed this

Twenty-ninth Day of October 1985

[SEAL]

Attest:

Attesting Officer

DONALD J. QUIGG

Commissioner of Patents and
Trademarks—Designate